US012100382B2

(12) United States Patent
Zhang et al.

(10) Patent No.: US 12,100,382 B2
(45) Date of Patent: Sep. 24, 2024

(54) TEXT-TO-SPEECH USING DURATION PREDICTION

(71) Applicant: Google LLC, Mountain View, CA (US)

(72) Inventors: Yu Zhang, Mountain View, CA (US); Isaac Elias, Haifa (IL); Byungha Chun, Tokyo (JP); Ye Jia, Santa Clara, CA (US); Yonghui Wu, Fremont, CA (US); Mike Chrzanowski, San Francisco, CA (US); Jonathan Shen, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 17/492,543

(22) Filed: Oct. 1, 2021

(65) Prior Publication Data

US 2022/0108680 A1 Apr. 7, 2022

Related U.S. Application Data

(60) Provisional application No. 63/087,162, filed on Oct. 2, 2020.

(51) Int. Cl.
*G10L 13/027* (2013.01)
*G10L 13/04* (2013.01)

(52) U.S. Cl.
CPC ............ *G10L 13/027* (2013.01); *G10L 13/04* (2013.01)

(58) Field of Classification Search
CPC .............................. G10L 13/027; G10L 13/04
See application file for complete search history.

(56) References Cited

U.S. PATENT DOCUMENTS 10,741,169 B1 8/2020 Trueba et al.
11,017,761 B2 * 5/2021 Peng ....................... G10L 25/30
11,017,763 B1 * 5/2021 Aggarwal ............... G10L 13/08
(Continued)

OTHER PUBLICATIONS

Ping, Wei, et.al. "Clarinet: Parallel wave generation in end-to-end text-to-speech." arXiv preprint arXiv:1807.07281 (2018). (Year: 2018).*
(Continued)

*Primary Examiner* — Bhavesh M Mehta
*Assistant Examiner* — Nandini Subramani
(74) *Attorney, Agent, or Firm* — Fish & Richardson P.C.

(57) ABSTRACT

Methods, systems, and apparatus, including computer programs encoded on computer storage media, synthesizing audio data from text data using duration prediction. One of the methods includes processing an input text sequence that includes a respective text element at each of multiple input time steps using a first neural network to generate a modified input sequence comprising, for each input time step, a representation of the corresponding text element in the input text sequence; processing the modified input sequence using a second neural network to generate, for each input time step, a predicted duration of the corresponding text element in the output audio sequence; upsampling the modified input sequence according to the predicted durations to generate an intermediate sequence comprising a respective intermediate element at each of a plurality of intermediate time steps; and generating an output audio sequence using the intermediate sequence.

20 Claims, 4 Drawing Sheets

(56) References Cited

U.S. PATENT DOCUMENTS

| | | | | |
|---|---|---|---|---|
| 2018/0247636 | A1* | 8/2018 | Arik | G10L 25/30 |
| 2019/0180732 | A1* | 6/2019 | Ping | G06F 9/30003 |

OTHER PUBLICATIONS

Okamoto, Takuma, et al. "Real-Time Neural Text-to-Speech with Sequence-to-Sequence Acoustic Model and WaveGlow or Single Gaussian WaveRNN Vocoders." Interspeech. 2019 (Year: 2019).*

Yu, Chengzhu, et al. "Durian: Duration informed attention network for multimodal synthesis." arXiv preprint arXiv:1909.01700 (2019) (Year: 2019).*

PCT International Search Report and Written Opinion in International Appln. No. PCT/2021/053417, dated Apr. 5, 2022, 16 pages.

Yao et al, "Sequence-to-sequence neural net models for grapheme-to-phoneme conversation" arXiv, 2015, 5 pages.

* cited by examiner

TEXT-TO-SPEECH USING DURATION PREDICTION

CROSS-REFERENCE TO RELATED APPLICATION

This application claims priority to U.S. Provisional Application No. 63/087,162, filed on Oct. 2, 2020. The disclosure of the prior application is considered part of and is incorporated by reference in the disclosure of this application.

BACKGROUND

This specification relates to performing text-to-speech using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that executes a neural network system configured to process an input text sequence representing a text sample and to generate an output audio sequence representing audio data characterizing a speaker speaking the text sample. This specification also describes a system implemented as computer programs on one or more computers in one or more locations that trains the neural network system. The neural network system can generate the output audio sequence using a duration prediction neural network that predicts, for each text element in the input text sequence, a respective duration of the text element in the output audio sequence.

The subject matter described in this specification can be implemented in particular embodiments so as to realize one or more of the following advantages.

Some existing techniques use autoregressive neural networks to generate audio outputs from text inputs, where the neural network iteratively generates new output elements until the network determines to stop, e.g., by generating a 'stop' token. Such autoregressive neural networks can be less robust than traditional, non-deep approaches because determining ad-hoc when to stop generating output tokens can result in problems such as early cut-off or failure to stop at all. Using techniques described in this specification, a neural network configured to perform text-to-speech can use a duration prediction neural network to predict, for each input token, a duration of the input token in the output sequence, e.g., a number of output tokens that correspond to the input token or a length of time that the input token represents. The neural network can therefore determine, before generating the audio output, the length of the audio output, eliminating or significantly reducing the risk of early cut-off or failure to stop.

Existing autoregressive neural networks furthermore impose little to no constraints to prevent repetition or skipping of output tokens. As described in this specification, by directly modeling the duration of each input token, a deep neural network configured to perform text-to-speech can determine an exact correspondence between the input sequence and the output sequence, thus minimizing the risk of repeating or skipping output tokens.

Conventionally, non-autoregressive systems upsampled an input sequence to generate an intermediate sequence by simply repeating each input token in the input sequence N times. Using techniques described in this specification, a system can leverage the predicted duration of each input token and, optionally, a range parameter that predicts the importance of the input token, to upsample the sequence in a more sophisticated way, generating an improved prior for the intermediate sequence. In particular, in some implementation described in this specification, the system can determine, for each input token in the input sequence, a distribution over the intermediate sequence, e.g., a Gaussian distribution, that models the range of the influence of the input token. Then, the system can determine the value of each intermediate token in the intermediate sequence according to a combination of the respective influences of the input tokens, e.g., a weighted sum of the values of the intermediate token in the respective distributions of the input tokens.

Using techniques described in this specification, a training system can train a duration prediction neural network that is a component of a text-to-speech neural network in an unsupervised (or semi-supervised) fashion. That is, the training system can train the duration prediction neural network, e.g., concurrently with one or more other subnetworks of the text-to-speech neural network, using training input sequences without having access to ground-truth durations for each input token in the training input sequences. Ground-truth durations for each text element in a text corpus can be scarce; for example, in some cases users must hand-tune a computationally-expensive separate model to generate ground-truth durations. By executing unsupervised training of the duration prediction neural network, the training system can avoid the need to perform this labor-intensive process.

In some implementations described in this specification, a system can control the pace of synthesized audio on a per-word or per-phoneme level by modifying the predicted durations of each word or phoneme determined by a duration prediction neural network, while still maintaining the naturalness of the synthesized speech.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
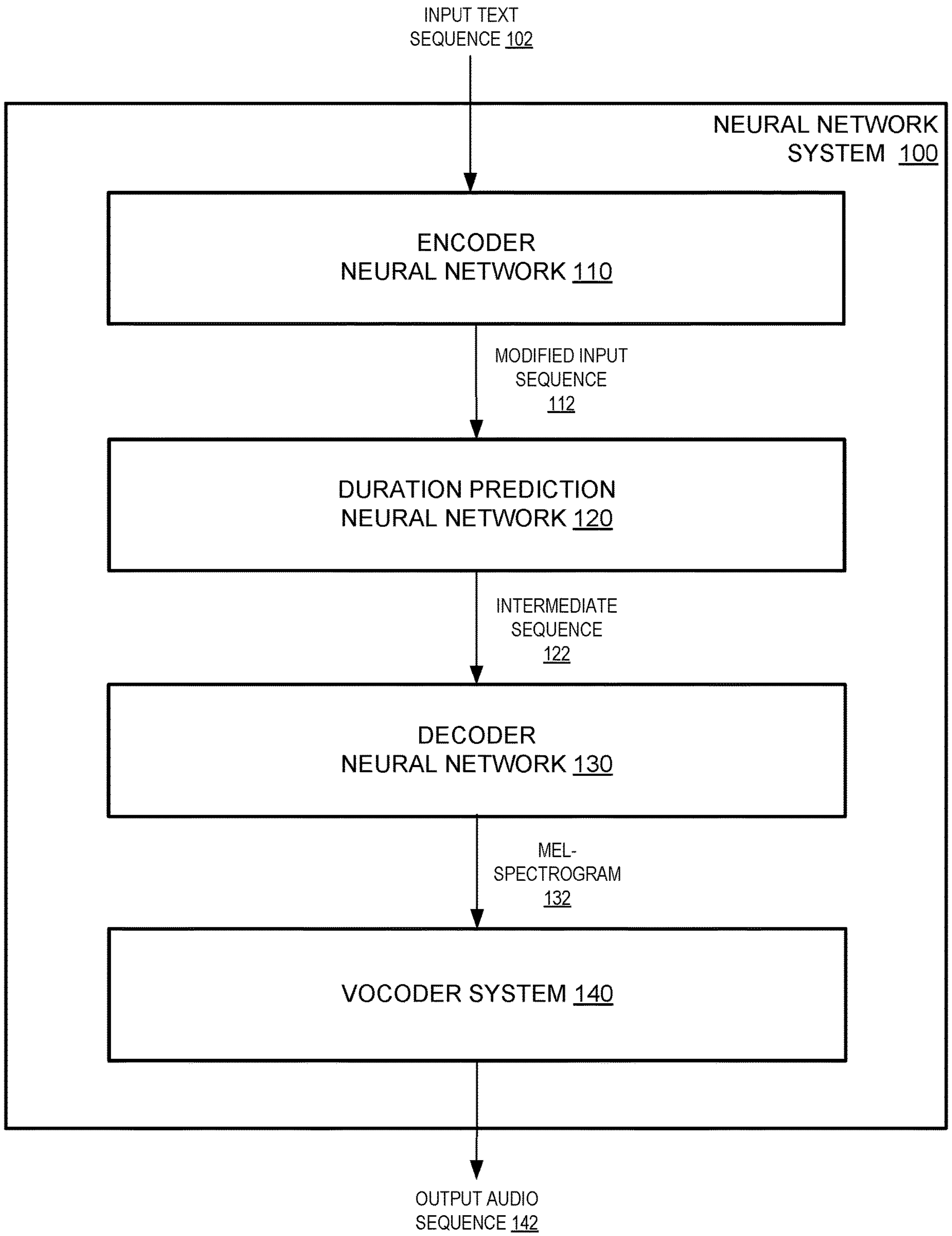
FIG. 1 is a diagram of an example neural network system.

FIG. 1 is a diagram of an example neural network system 100. The neural network system 100 is an example of a system implemented as computer programs on one or more computers in one or more locations, in which the systems, components, and techniques described below can be implemented.

The neural network system 100 is configured to process an input text sequence 102 that represents a text sample and to generate an output audio sequence 142 that represents audio data of a speaker speaking the text sample. In other words, the output audio sequence 142 is "conditioned" on the input text sequence 102.

The input text sequence 102 can include a respective text element at each of multiple input time steps. For example, each text element can represent a character, a word, or a phoneme. As another example, each text element can include linguistic features that have been derived from the input text and that correspond to the respective input time step. As a particular example, for each word or sub-word in the input text, the linguistic features can include one or more of a morphological lemma of the word or sub-word; one or more other morphological features of the word or sub-word, e.g., case, number, gender, person, and/or tense; a part-of-speech tag of the word or sub-word; a dependency label identifying a different word on which the word or sub-word depends; or an identification of whether the sub-word occupies the beginning, inside, or end of the corresponding word. In some implementations, the input text sequence 102 includes respective text elements for word boundaries, punctuation, and/or an end-of-sequence token.

The output audio sequence 142 may comprise samples of a time-domain audio waveform. That is, the output audio sequence 142 can include a respective sample of an audio wave at each of a sequence of output time steps. For example, the audio sample at a given output time step can be an amplitude value, a compressed amplitude value, or companded amplitude value of the audio wave. The output audio sequence may thus represent synthesized speech corresponding to the input text sequence.

The neural network system 100 includes an encoder neural network 110, a duration prediction neural network 120, a decoder neural network 130, and a vocoder system 140.

The encoder neural network 110 is configured to process the input text sequence 102 and to generate a modified input sequence 112 that includes, at each of the multiple input time steps, a representation of the corresponding text element in the input text sequence 102. Each representation in the modified input sequence 112 can be an embedding of the corresponding text element of the input text sequence 102. In this specification, an embedding is an ordered collection of numeric values that represents an input in a particular embedding space. For example, an embedding can be a vector of floating point or other numeric values that has a fixed dimensionality.

The encoder neural network 110 can obtain, for each text element in the input text sequence 102, a predetermined embedding of the text element. For example, if the text elements are identifications of phonemes, the encoder neural network 110 can obtain an embedding for each phoneme identified in the input text sequence 102. The predetermined embeddings of the text elements can be machine learned. For example, the embeddings can be trained concurrently with one or more of the neural networks in the neural network system 100. As another example, the embeddings can be pre-trained using a different neural network to perform a text processing machine learning task, e.g., a language modelling machine learning task.

In some implementations, the encoder neural network 110 can compose the modified input sequence 112 directly from the predetermined embeddings, where the representation in the modified input sequence 112 corresponding to each text element is equal to the embedding of the text element. That is, the encoder neural network 110 can be an encoder system that does not include any neural network layers.

In some other implementations the encoder neural network 110 can process the embeddings of the text elements in the input text sequence 102 using one or more neural network layers to generate the representations of the text elements in the modified input sequence 112. For example, the encoder neural network 110 can process the sequence of embeddings using one or more convolutional neural network layers and/or one or more long short-term memory (LSTM) neural network layers, e.g., bi-directional LSTM neural network layers. As another example, the encoder neural network 110 can process the sequence of embeddings using one or more self-attention neural network layers.

In some implementations, the encoder neural network 110 can process the embeddings of the text elements using the one or more neural network layers to generate respective initial representations for each text element. Then, the encoder neural network 110 can combine, for each initial representation corresponding to a respective text element, i) the initial representation and ii) an identification of a class to which the output audio sequence 142 should belong to generate the representation of the text element in the modified input sequence 112. For example, the class can identify a particular speaker that the audio data represented by the output audio sequence 142 should sound like. The identified class can be one of a predetermined number of possible classes to which the output audio sequence 142 can belong.

The duration prediction neural network 120 is configured to process the modified input sequence 112 and to generate, for each representation in the modified input sequence, a predicted duration of the corresponding text element in the output audio sequence 142. That is, for each representation in the modified input sequence 112, the predicted duration of the representation represents a length of time that the text element corresponding to the representation will take to be spoken in the audio data represented by the output audio sequence.

After the duration prediction neural network 120 generates the respective predicted duration for each representation in the modified input sequence 112, the duration prediction neural network 120 can upsample the modified input sequence 112 according to the predicted durations to generate an intermediate sequence 122 that includes a respective intermediate element at each of multiple intermediate time steps. Generally, there are more intermediate time steps in the intermediate sequence 122 than input time steps in the input text sequence 102.

For example, each predicted duration can be a floating point value representing a number of seconds or milliseconds that the corresponding text element will take. As another example, each predicted duration can be an integer representing a number of output time steps that the corresponding text element will take.

In some implementations, the duration prediction neural network is configured to process the modified input sequence 112 and to generate, for each representation in the modified input sequence 112, a respective single value representing the predicted duration. As a particular example, the duration prediction neural network 120 can process the modified input sequence 112 using one or more bi-directional LSTM neurals network layers. The duration prediction neural network 112 can also include an output projection neural network layer, e.g., a feedforward neural network layer, that is configured to receive a respective layer input for each representation in the modified input sequence 112 and to generate the predicted duration for each representation in the modified input sequence 112.

In some other implementations, the duration prediction neural network 120 is configured to generate, for each representation in the modified input sequence 112, a respective distribution over the intermediate elements of the intermediate sequence 122 that models the influence of the representation on each intermediate element in the intermediate sequence 122. That is, for each representation in the modified input sequence 112, the corresponding distribution can include a value for each intermediate element in the intermediate sequence 122 representing the influence of the representation on the intermediate element. This process is described in more detail below with reference to FIG. 2.

In some implementations, after generating an initial predicted duration for each representation in the modified input sequence 112 (e.g., using one or more neural network layers as described below with reference to FIG. 2), the duration prediction neural network 120 can heuristically update one or more of the initial predicted durations to generate final predicted durations.

For example, the duration prediction neural network 120 can scale each initial predicted duration by a same scaling factor (e.g., a scaling factor between 0.8 and 1.25). This can be useful when synthesizing audio data for speakers with different speech patterns, e.g., speakers who speak more slowly or quickly than average.

As a particular example, the neural network system 100 can determine the scaling factor by comparing (i) a distribution of word/phoneme durations in audio data corresponding to the particular speaker to be characterized in the output audio sequence 142 and (ii) a distribution of word/phoneme durations in audio data corresponding to a wider population. For instance, the scaling factor can be determined to be proportional to a ratio of the means of the two distributions.

As another particular example, the duration prediction neural network 120 can generate, for each representation in the modified input sequence 112, (i) a predicted duration corresponding to a particular speaker (e.g., using an identification of a class corresponding to the particular speaker, as described above) and (ii) a respective predicted duration corresponding to one or more other speakers (e.g., professional speakers). The duration prediction neural network 120 can then combine, for each representation, the predicted durations corresponding to respective speakers to generate the final predicted duration for the representation, e.g., by determining a mean (for instance, the geometric mean) of the predicted durations. Performing this technique can improve the intelligibility of the output audio sequence 142. For example, the particular speaker may have a unique speech pattern that is difficult to understand. Therefore, the duration prediction neural network 120 can determine the final predicted durations according to both the particular speaker (so that the output audio sequence 142 characterizes the unique speech pattern of the particular speaker) and one or more professional speakers (so that the output audio sequence 142 is more intelligible for listeners).

As another example, the duration prediction neural network 120 can identify one or more particular representations in the modified input sequence 112 whose initial predicted duration should be modified. As a particular example, the duration prediction neural network 120 can identify one or more representations whose corresponding text element in the input text sequence 102 represents a word or phoneme that should be emphasized. For instance, the duration prediction neural network 120 can obtain identifications of the text elements from an external natural language machine learning model that is configured to process the input text sequence 102 (or a model input characterizing the same input text as the input text sequence 102) and to identify one or more text elements that should be emphasized in the corresponding synthesized audio data.

Having determined the predicted duration for each representation in the modified input sequence 112, the duration prediction neural network 120 can upsample the modified input sequence 112 according to the predicted durations to generate the intermediate sequence 122.

For example, in implementations in which the duration prediction neural network 120 generates a respective single value representing the predicted duration of each representation in the modified input sequence 112, the duration prediction neural network 120 can repeat, for each representation in the modified input sequence 112, the representation in the intermediate sequence 122 a number of times identified by the predicted duration.

As another example, in implementations in which the duration prediction neural network 120 generates a distribution over the intermediate sequence 122, the duration prediction neural network 120 can determine, for each intermediate element in the intermediate sequence 122, the value for the intermediate element by combining the respective influences of the representations in the modified input sequence 112 on the intermediate element according to their respective distributions. This process is described in more detail below with reference to FIG. 2.

In some implementations, the intermediate time steps are the same as the output time steps; that is, each intermediate element in the intermediate sequence 122 can correspond to a respective audio sample in the output audio sequence 142. In some other implementations, there are fewer intermediate time steps than output time steps, and the intermediate time steps can be further upsampled to generate the output audio sequence 142, e.g., by the vocoder system 140, as is described in more detail below.

In some implementations, after upsampling the modified input sequence 112 to generate an upsampled sequence that includes a respective upsampled representation at each intermediate time step, the duration prediction neural network 120 combines, for the upsampled representation corresponding to each intermediate time step, i) the upsampled representation and ii) a positional embedding of the upsampled representation to generate the intermediate element corresponding to the intermediate time step in the intermediate sequence 122.

The positional embedding of an upsampled representation represents a position of the upsampled representation in the upsampled sequence. Each positional embedding can be machine-learned, e.g., concurrently with one or more of the encoder neural network 110, the duration prediction neural network 120, or the decoder neural network 130. As a particular example, the positional embeddings can be sinusoidal positional embeddings.

In some implementations, the positional embedding of an upsampled representation represents a global position of the upsampled representation in the upsampled sequence, i.e., the position of the upsampled representation among the intermediate time steps.

In some other implementations, the positional embedding of an upsampled representation represents a local position of the upsampled representation in the upsampled sequence. For example, the positional embedding can represent the position of the upsampled representation in a subsequence of upsampled representations corresponding to the same representation in the modified input sequence (i.e., corresponding to the same text element in the input text sequence 102). That is, each upsampled representation can correspond to a particular representation in the modified input sequence 112, i.e., the representation in the modified input sequence 112 in whose predicted duration the upsampled representation lies. The first upsampled representation in each subsequence can have the same positional embedding, the second upsampled representation in each subsequence can have the same positional embedding, and so on.

In some other implementations, the duration prediction neural network 120 can add positional embeddings to the modified input sequence 112 (e.g., where the positional embedding of each representation in the modified input sequence 112 represents a position of the representation within the modified input sequence 112) before upsampling the modified input sequence 112 to generate the intermediate sequence 122. This process is described in more detail below with reference to FIG. 2.

In some implementations, during training of one or more downstream neural networks to the duration prediction neural network 120 (e.g., the decoder neural network 130 and/or a vocoder neural network of the vocoder system 140), a training system can execute "teacher forcing" when using the predicted durations to upsample the modified input sequence 112. That is, instead of generating the intermediate sequence 122 by upsampling the modified input sequence 112 according to the predicted durations actually generated by the duration prediction neural network 120, the training system can upsample the modified input sequence 112 according to "ground-truth" durations representing the output that the duration prediction neural network 120 should generate in response to processing the modified input sequence 112. Example techniques for training the duration prediction neural network 120 are discussed in more detail below.

The decoder neural network 130 is configured to process the intermediate sequence 122 and to generate a sequence of audio features that includes a respective set of audio features for each intermediate time step in the intermediate sequence 122. The set of audio features for a particular intermediate time step represents the output audio sequence 142 at the one or more output time steps corresponding to the particular intermediate time step.

For example, the sequence of audio features can represent a spectral representation of the output audio sequence 142. As a particular example, the decoder neural network 130 can be configured to generate a respective mel-frequency cepstral coefficient (MFCC) feature representation for each intermediate time step.

As another particular example, the decoder neural network 130 can be configured to generate a mel-spectrogram 132 corresponding to the output audio sequence 142, i.e., a mel-spectrogram 132 representing the same audio data as the output audio sequence 142. The mel-spectrogram 132 can include a respective spectrogram frame at each intermediate time step of the intermediate sequence 122. The spectrogram frame corresponding to each intermediate time step represents a predicted distribution of audio frequencies of the output audio sequence 142 at the one or more output time steps corresponding to the intermediate time step.

Although the below description refers implementations in which the decoder neural network 130 generates a mel-spectrogram 132, it should be understood that the techniques described below can be used to implement a decoder neural network 130 that generates any appropriate set of audio features corresponding to the output audio sequence 142.

In some implementations, the decoder neural network 130 generates spectrogram frames of the mel-spectrogram 132 autoregressively. For example, at a first processing time step in a sequence of processing time steps, the decoder neural network 130 can process the first intermediate element in the intermediate sequence 122 to generate the first frame of the mel-spectrogram 132. Then, at each subsequent processing time step in the sequence of processing time steps, the decoder neural network 130 can process i) the subsequent intermediate element in the intermediate sequence 122, and ii) the preceding frame of the mel-spectrogram 132 generated in the preceding processing time step to generate the subsequent frame of the mel-spectrogram 132. That is, each processing time step can correspond to a respective intermediate time step in the intermediate sequence 122, and in each processing time step the decoder neural network 130 generates the spectrogram frame of the mel-spectrogram 132 corresponding to the respective intermediate time step.

In some implementations, during training of the decoder neural network 130, a training system can execute teacher forcing when autoregressively processing preceding spectrogram frames to generate new spectrogram frames. That is, instead of processing the spectrogram frame actually generated by the decoder neural network 130 at the preceding processing time step, the training system can process a corresponding spectrogram frame of a "ground-truth" mel-spectrogram representing the output that the decoder neural network 130 should generate in response to processing the intermediate sequence 122. Example techniques for training the decoder neural network 130 are discussed in more detail below.

In some implementations, the decoder neural network 130 includes a "pre-net" subnetwork that processes, at each processing time step, the preceding frame of the mel-spectrogram 132 to generate an embedding of the preceding frame. The decoder neural network 130 can then process i) the intermediate element of the intermediate sequence 122 corresponding to the current processing time step and ii) the embedding of the preceding spectrogram frame to generate the subsequent spectrogram frame of the mel-spectrogram 132. As a particular example, the pre-net subnetwork can include one or more feedforward neural network layers.

In some such implementations, the decoder neural network 130 concatenates i) the intermediate element of the intermediate sequence 122 corresponding to the current processing time step and ii) the embedding of the preceding spectrogram frame to generate a first concatenated representation, and then processes the first concatenated representation using a first subnetwork of the decoder neural network 130 to generate an embedding of the first concatenated representation. For example, the first subnetwork can include one or more uni-directional LSTM neural network layers.

The decoder neural network 130 can then concatenate i) the intermediate element of the intermediate sequence 122 corresponding to the current processing time step and ii) the embedding of the first concatenated representation to generate a second concatenated representation, and then process the second concatenated representation using a second subnetwork of the decoder neural network 130 to generate the subsequent frame of the mel-spectrogram 132. For example, the second subnetwork can include an output projection neural network layer, e.g., a feedforward neural network layer, that is configured to generate the subsequent frame of the mel-spectrogram.

In some implementations, after generating a sequence of spectrogram frames as described above, the decoder neural network 130 is configured to further process the mel-spectrogram frames to generate the final mel-spectrogram 132. That is, the mel-spectrogram generated, e.g., by the second subnetwork can be an "initial" mel-spectrogram, and the decoder neural network 130 can process the initial mel-spectrogram to generate the final mel-spectrogram 132. For example, the decoder neural network 130 can process the initial mel-spectrogram using a "post-net" subnetwork to generate the final mel-spectrogram 132. As a particular example, the post-net subnetwork can include one or more convolutional neural network layers that are each configured to apply a convolutional filter to the spectrogram frames of the initial mel-spectrogram (or to processed versions of the spectrogram frames).

The vocoder system 140 is configured to process the mel-spectrogram 132 to generate the output audio sequence 142. The vocoder system 140 can use any appropriate technique to generate the output audio sequence 142 from the mel-spectrogram 132. For example, the vocoder system 140 can include a vocoder neural network that is configured to process the mel-spectrogram 132 to generate the output audio sequence.

In some implementations, the vocoder system 140 further upsamples the mel-spectrogram so that there are more output time steps in the output audio sequence 142 than intermediate time steps in the mel-spectrogram 132. For example, the vocoder system 140 can be configured to generate an initial output audio sequence from the mel-spectrogram 132 that includes a respective initial audio sample for each intermediate time step, then generate the output audio sequence 142 by processing the initial output audio sequence using a neural network, e.g., a convolutional neural network, that is configured to refine the initial output audio sequence.

In some implementations, the neural network system 100 does not include a vocoder system 140, and instead outputs the mel-spectrogram 132. That is, the neural network system 100 can be configured to generate mel-spectrograms that represent output audio sequences instead of being configured to generate the output audio sequences themselves.

In some implementations, multiple neural networks of the neural network system 100 can be trained concurrently. For example, one or more of: the encoder neural network 110; the duration prediction neural network 120; the decoder neural network 130; or, optionally, a vocoder neural network of the vocoder system 140 can be trained concurrently. For example, training system can determine an error in the output audio sequence 142 and backpropagate the error through the neural network system 100 to determine a parameter update for the one or more neural networks, e.g., using stochastic gradient descent.

In some such implementations, the encoder neural network 110, the duration prediction neural network 120, and the decoder neural network 130 can be trained concurrently using supervised learning. That is, a training system can determine parameter updates for the neural networks using a set of training examples that each include i) a training input text sequence, ii) a ground-truth mel-spectrogram, and iii) ground-truth durations corresponding to each text input in the training input text sequence.

A training system can process each training input text sequence using the neural network system 100 to generate a predicted mel-spectrogram 132, and then compute a loss function that represents an error in the predicted mel-spectrogram 132.

For example, the loss function can include a first term characterizing an error in the predicted durations, generated by the duration prediction neural network 120, of the representations in the modified input sequence 112. As a particular example, the first term can be (or be proportional to):

$$\mathcal{L}_{dur} = \frac{1}{N}\|d - d^*\|_2^2,$$

where N is the number of representations in the modified input sequence 112, d represents the predicted durations, d* represents the ground-truth durations, and $\|\cdot\|_2$ is an $L_2$ loss.

As another example, the loss function can include a second term characterizing an error in the generated mel-spectrogram 132. As a particular example, the second term can be (or be proportional to):

$$\mathcal{L}_{spec} = \frac{1}{TK}\left(\sum_{t=1}^{T} \|y_t - y_t^*\|_1 + \|y_t - y_t^*\|_2^2\right)$$

where T is the number of intermediate time steps in the mel-spectrogram, K is the number of frequencies represented in the mel-spectrogram, $y_t$ is the value of the predicted mel-spectrogram at intermediate time step t, $y_t^*$ is the value of the ground-truth mel-spectrogram at intermediate time step t, $\|\cdot\|_1$ is an $L_1$ loss, and $\|\cdot\|_2$ is an $L_2$ loss.

In some implementations, as described above, the decoder neural network 130 first generates an initial mel-spectrogram and then processes the initial mel-spectrogram to generate the final predicted mel-spectrogram 132. In some such implementations, the second term of the loss function can include a respective term corresponding to both the initial mel-spectrogram and the final mel-spectrogram 132. That is, the training system can determine an error both in the initial mel-spectrogram and the final mel-spectrogram 132 using the ground-truth mel-spectrogram. As a particular example, the second term can be (or be proportional to):

$$\mathcal{L}_{spec} = \frac{1}{TK}\sum_{t=1}^{T}\left(\|y_t' - y_t^*\|_1 + \|y_t' - y_t^*\|_2^2 + \|y_t - y_t^*\|_1 + \|y_t - y_t^*\|_2^2\right),$$

wherein $y_t'$ is the value of the initial mel-spectrogram at intermediate time step t, $y_t$ is the value of the final mel-spectrogram at intermediate time step t, and $y_t^*$ is the value of the ground-truth mel-spectrogram at intermediate time step t.

In some other implementations, the encoder neural network 110, the duration prediction neural network 120, and the decoder neural network 130 can be trained concurrently using semi-supervised or unsupervised learning. That is, a training system can determine parameter updates for the neural networks when training examples that include ground-truth durations and/or ground-truth mel-spectrograms are scarce or unavailable. Example techniques for training the neural network system 100 using unsupervised or semi-supervised learning are described below with reference to FIG. 3.

The neural network system 100 can be deployed in any appropriate setting. For example, the neural network system 100 can be deployed on an edge device, e.g., a mobile phone, a tablet computer, a smart speaker, or on a device embedded in a vehicle. For instance, the neural network system 100 can be configured to generate an output audio sequence 142 representing audio data that is to be played for a user. As a particular example, the audio data can be played by the speakers of a mobile phone or tablet computer, e.g., in response to a query provided by the user. As another particular example, the audio data can be played by speakers of a vehicle, e.g., to provide an alert or instructions to the driver or another user in the vehicle.

As another example, the neural network system 100 can be deployed on the cloud, e.g., in a data center that is communicatively connected with one or more edge devices. The edge devices can provide text data to the neural network system 100 with a request to synthesize audio characterizing the text data. The neural network system 100 can process an input text sequence 102 corresponding to the text data and generate an output audio sequence 142, and then provide the output audio sequence 142 (or other data characterizing the output audio sequence 142) back to the edge device in response to the request.

Figure 2:
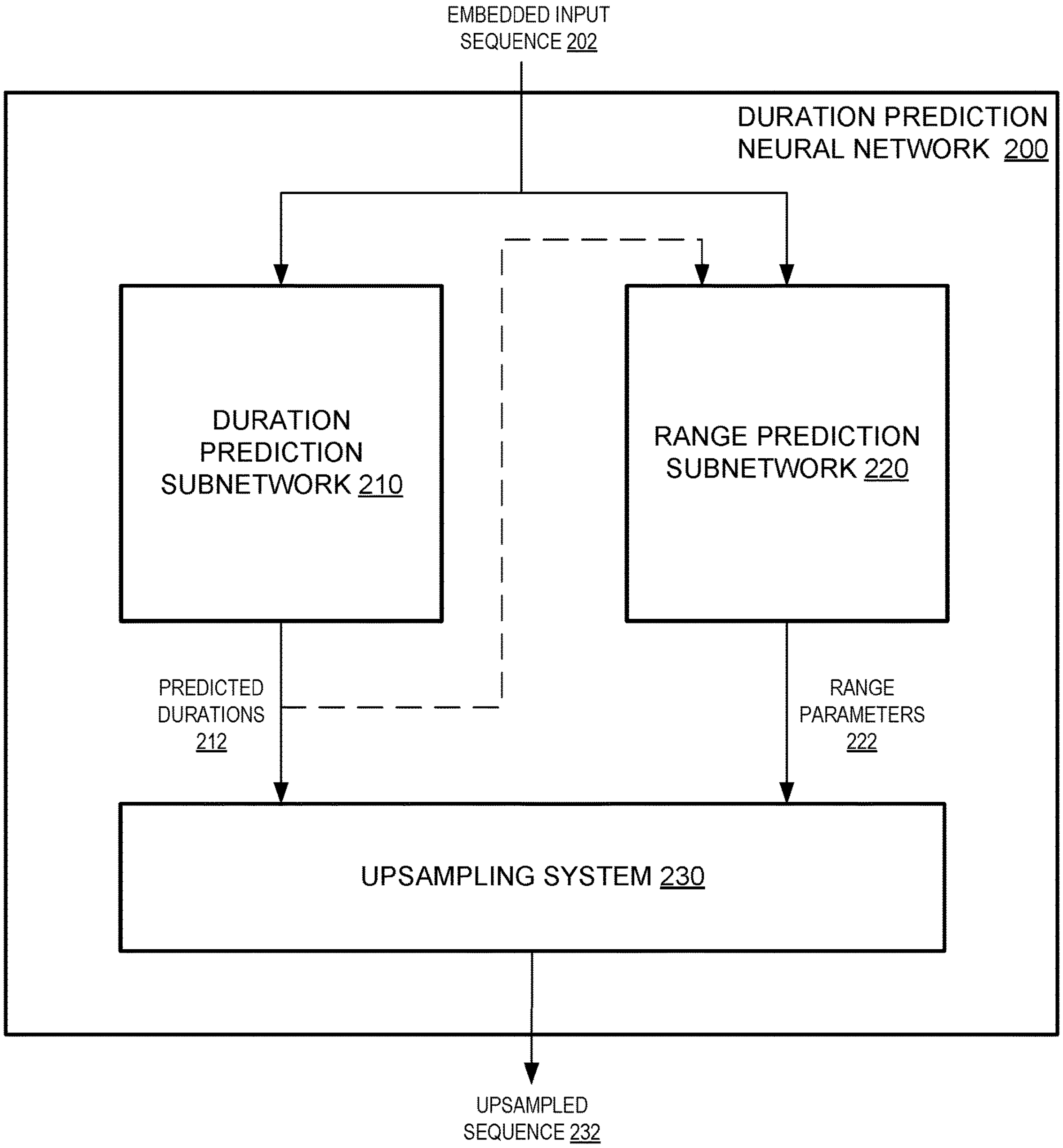
FIG. 2 is a diagram of an example duration prediction neural network.

FIG. 2 is a diagram of an example duration prediction neural network 200. The duration prediction neural network 200 is an example of a system implemented as computer programs on one or more computers in one or more locations, in which the systems, components, and techniques described below can be implemented.

The duration prediction neural network 200 is configured to obtain an embedding 202 of an input text sequence that represents text data. The input text sequence can include a respective text element at each of multiple input time steps, and the embedded input sequence 202 can include a respective representation of each text element corresponding to a respective input time step.

The duration prediction neural network 200 is configured to process the input text sequence 102 and to generate an upsampled sequence 232 that represents the same text data as the input text sequence 102. The upsampled sequence 232 includes a respective intermediate element at each of multiple intermediate time steps, where the number of intermediate time steps is greater than the number of input time steps in the embedded input sequence 202.

The duration prediction neural network 200 is configured to generate the upsampled sequence 232 by predicting, for each text element represented by the embedded input sequence 202, a respective duration of the text element if the text data were spoken. That is, the duration of a text element represents the amount of time that will be used to speak the text represented by the text element, if audio data were generated from the embedded input sequence 202.

For example, the duration prediction neural network 200 can be a component of a neural network system that is configured to process the input text sequence and to generate an output audio sequence characterizing a speaker speaking the input text sequence. As a particular example, the duration prediction neural network 200 can be the duration prediction neural network 120 of the neural network system 100 described above with reference to FIG. 1.

The duration prediction neural network 200 includes a duration prediction subnetwork 210, a range prediction subnetwork 220, and an upsampling system 230.

The duration prediction neural network 200 is configured to determine, for each representation in the embedding input sequence 202, a respective distribution over the intermediate elements of the upsampled sequence 232 that models the influence of the representation on each intermediate element in the upsampled sequence 232. For each representation in the embedded input sequence 202, the corresponding distribution can define a value for each intermediate element in the upsampled sequence 232 representing the influence of the representation on the intermediate element.

For each representation in the embedding input sequence 202, the distribution can be parameterized by (i) a predicted duration 212 of the representation determined by the duration prediction subnetwork and (ii) a range parameter 222 of the representation determined by the range prediction subnetwork 220. As is described in more detail below, the center of the distributions can be defined by the respective predicted durations 212, while the variance of the distributions can be defined by the respective range parameters 222. The range parameter 222 for a particular representation can represent the importance of the representation, e.g., its relative influence over the output audio sequence.

In particular, the duration prediction subnetwork 210 is configured to process the embedded input sequence 202 and to generate, for each representation in the embedded input sequence 202, a respective predicted duration 212. For example, each predicted duration 212 can be an integer representing a number of intermediate time steps in the upsampled sequence 232.

As a particular example, the duration prediction subnetwork 210 can process the embedded input sequence 202 using one or more bi-directional LSTM neural network layers. The duration prediction subnetwork 210 can also include an output projection neural network layer, e.g., a feedforward neural network layer, that is configured to receive a respective layer input for each representation in the embedded input sequence 202 and to generate the predicted duration 212 for each representation in the embedded input sequence 202.

The range prediction subnetwork 220 is configured to process the embedded input sequence 202 and, optionally, the predicted durations 212 generated by the duration prediction subnetwork 210 and to generate, for each representation in the embedded input sequence 202, a respective range parameter 222. For example, the range prediction subnetwork 220 can combine, for each representation in the embedded input sequence 202, i) the representation and ii) the predicted duration 212 of the representation, e.g., using concatenation. The range prediction subnetwork 220 can then process the combined representation to generate the corresponding range parameters 222. As a particular example, the range prediction subnetwork 220 can include one or more bi-directional LSTM neural network layers. The range prediction subnetwork 220 can also include an output projection neural network layer, e.g., a feedforward neural network layer, that is configured to receive a respective layer input for each representation in the embedded input sequence 202 and to generate the range parameter 222 for each representation in the embedded input sequence 202.

The upsampling system 230 is configured to generate the upsampled sequence 232 from the embedded input sequence 202 according to the respective predicted durations 212 and the range parameters 222 of the representations of the embedded input sequence 202. For each intermediate element in the upsampled sequence 232, the upsampling system 230 can then determine the value for the intermediate element by combining the respective influences of each representation in the embedded input sequence 202 on the intermediate element, as defined by the predicted durations 212 and the range parameters 222.

For example, for each intermediate element of the upsampled sequence 232, the upsampling system 230 can determine a weighted sum of the values of the intermediate element in the respective distribution of each representation in the embedded input sequence 202. In some implementations, the weight corresponding to each representation in the upsampled input sequence 232 can be normalized using the sum of the respective values of the intermediate element in each distribution.

As a particular example, the distribution over the upsampled sequence 232 for each representation can be a Gaussian distribution. In this example, the value $u_t$ for an intermediate element t in the upsampled sequence 232 can be determined by computing:

$$w_{ti} = \frac{\mathcal{N}(t; c_i, \sigma_i^2)}{\sum_{j=1}^{N} \mathcal{N}(t; c_i, \sigma_i^2)},\ u_t = \sum_{i=1}^{N} w_{ti} h_i,$$

where $h_i$ is the value of representation i in the embedded input sequence 202, $w_{ti}$ is the weight of representation i when calculating the value $u_t$ of intermediate element t, N is the number of representations in the embedded input sequence 202, and $N(t; c_i, \sigma_i^2)$ is the value of intermediate element t in the distribution over intermediate elements corresponding to representation i.

The distribution over the intermediate elements for each representation i can have a center $c_i$ that is determined using the predicted durations 212 of the representations. The center $c_i$ can correspond to the center of the predicted duration 212 in the upsampled sequence 232. For example, the upsampling system 230 can determine the center $c_i$ of the distribution corresponding to representation i by computing:

$$c_i = \frac{d_i}{2} + \sum_{j=1}^{i-1} d_j,$$

where $d_i$ is the predicted duration of representation i and each $d_j$ is the predicted duration of a respective representation that precedes the representation i in the embedded input sequence 202.

The distribution over the intermediate elements for each representation i can have a variance $\sigma_i^2$ that is determined using the range parameters 222 of the representations. In some implementations, the upsampling system 230 determines the generated range parameter 222 for representation i to be equal to the variance $\sigma_i^2$ of the corresponding distribution. In some other implementations, the upsampling system 230 determines the generated range parameter 222 to be equal to the standard deviation $\sigma_i$ of the corresponding distribution.

In some implementations, upsampling according to respective distributions over the upsampled sequence 232 is fully-differentiable, allowing the duration prediction neural network 200 to be trained end-to-end with one or more downstream neural networks (e.g., a decoder neural network, e.g., the decoder neural network 130 described above with reference to FIG. 1). This differentiability can be particularly important when ground-truth durations are not available and thus the duration prediction neural network 200 cannot be trained in a supervised fashion using the ground-truth durations.

In some implementations, the duration prediction neural network 200 does not include the range prediction subnetwork 220, and the variance $\sigma_i^2$ of the distribution for each representation i is fixed. In some such implementations, the variance $\sigma_i^2$ can depend on the speaker that the output audio sequence is to characterize.

As described above with reference to FIG. 1, in some implementations, the duration prediction neural network 200 combines each intermediate element in the upsampled sequence 232 with a respective positional embedding.

In some other implementations, the duration prediction neural network 200 incorporates positional embeddings into the representations in the embedded input sequence 202 (e.g., by appending the positional embeddings to the representations) before upsampling the embedded input sequence 202 to generate the upsampled sequence 232. Because each intermediate element in the upsampled sequence 232 can be a linear combination of the representations in the embedded input sequence 202 (where the linear combination is determined according to the distributions described above), the positional embeddings appended to the representations can thus also be linearly combined to generate a respective different positional embedding for each intermediate element in the upsampled sequence 232. In other words, the duration prediction neural network 200 can determine a respective positional embedding $p_t$ for each intermediate element in the upsampled sequence 232 by computing:

$$p_t = \sum_{i=1}^{N} w_{ti} q_i$$

where $q_i$ is the positional embedding of the $i^{th}$ representation in the embedded input sequence 202, and $w_{ti}$ is defined as above.

In some implementations, the duration prediction subnetwork 210 and the range prediction subnetwork 220 are trained concurrently with one or more other neural networks, e.g., one or more: of an encoder neural network (e.g., the encoder neural network 110 described above with reference to FIG. 1) configured to generate the embedded input sequence 202 from the input sequence; a decoder neural network (e.g., the decoder neural network 130 described above with reference to FIG. 1) configured to generate a set of audio features from the upsampled sequence 232; or a vocoder neural network (e.g., a vocoder neural network that is component of the vocoder system 140 described above with reference to FIG. 1) configured to generate the output audio sequence from the sets of audio features generated from the upsampled sequence 232.

For example, as described above with reference to FIG. 1, the duration prediction subnetwork 210 and the range prediction subnetwork 220 can be trained using ground-truth durations for each representation in the embedded input sequence 202.

As another example, the duration prediction subnetwork 210 and the range prediction subnetwork 220 can be trained without access to any training examples that include ground-truth durations, or with access to very few training examples that include ground-truth durations. Example techniques for training the duration prediction neural network 200 using unsupervised or semi-supervised learning are described in more detail below with reference to FIG. 3.

Figure 3:
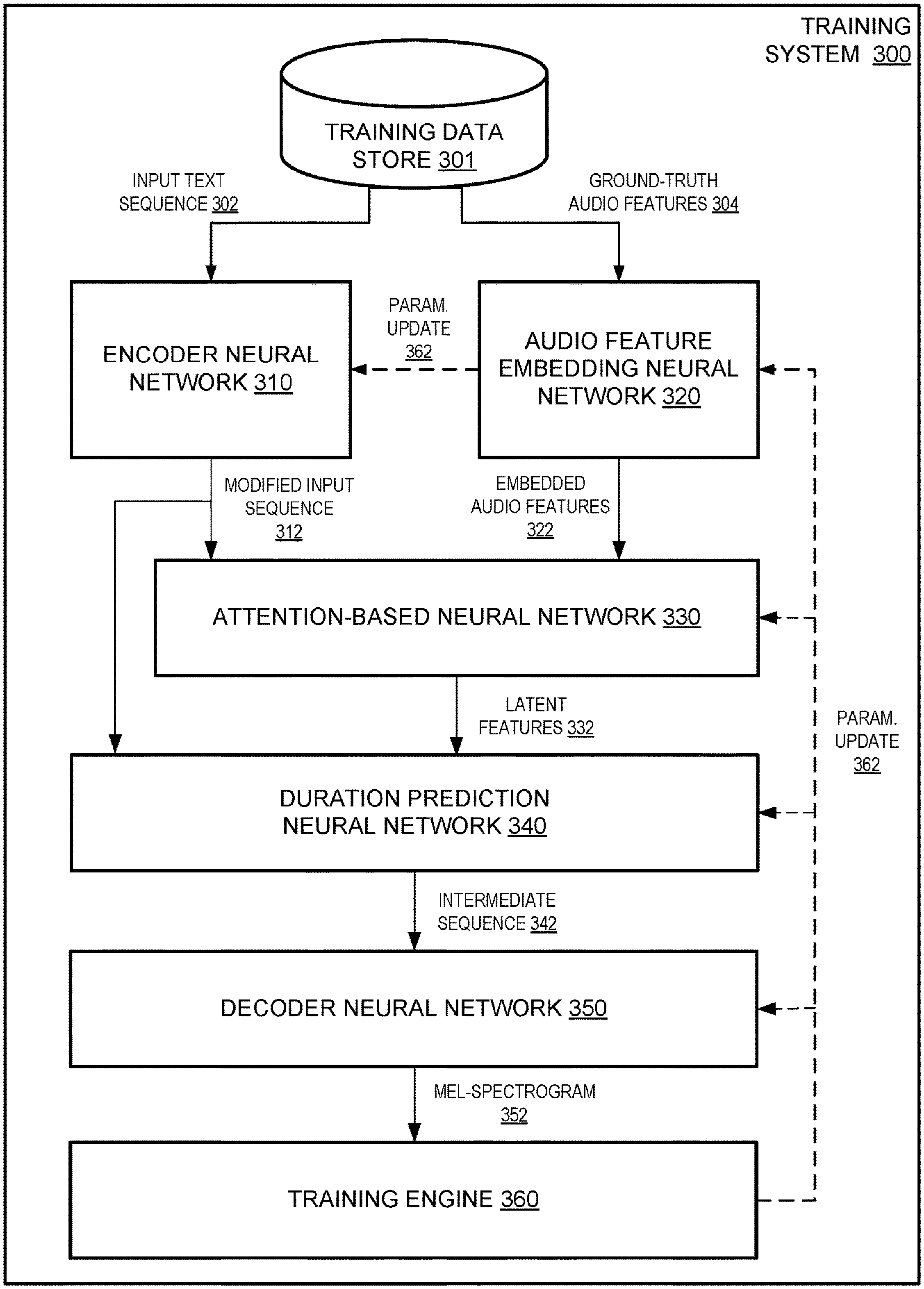
FIG. 3 is a diagram of an example training system.

FIG. 3 is a diagram of an example training system 300. The training system 300 is an example of a system implemented as computer programs on one or more computers in one or more locations, in which the systems, components, and techniques described below can be implemented.

The training system 300 is configured to generate machine-learned parameters for a neural network that is configured to process an input text sequence 302 and to generate a mel-spectrogram 352 characterizing audio data of the input text sequence 302 being spoken. For example, the neural network can be a component of a neural network system (e.g., the neural network system 100 described above with reference to FIG. 1) that is configured to generate an output audio sequence from the mel-spectrogram 352 using a vocoder system (e.g., the vocoder system 140 described above with reference to FIG. 1).

The neural network includes an encoder neural network 310, a direction prediction neural network 340, and a decoder neural network 350.

The training system 300 is configured to train the neural network using a training data set stored in a training data store 301. The training data set includes multiple training examples that each include (i) a training input text sequence 302 and (ii) a set of ground-truth audio features 304 representing audio data characterizing a speaker speaking the training input text sequence 302. However, these training examples do not include ground-truth durations for the text elements of the training input text sequence 302.

To train the neural network without access to ground-truth durations, the training system 300 can modify the architecture of the neural network to add (i) an audio feature embedding neural network 320 and (ii) an attention-based neural network 330.

The audio feature embedding neural network 320 and the attention-based neural network 330 are configured to process the ground-truth audio features 304 and extract latent features 332 from the ground-truth audio features 304, in order to guide the training of the neural network without ground-truth durations. For example, the audio feature embedding neural network 320 and the attention-based neural network 330 can leverage duration information implicitly encoded into the ground-truth audio features 304.

The training input text sequence 302 includes a respective text element for each of multiple input time steps.

The ground-truth audio features 304 includes a respective set of audio features for each of multiple intermediate time steps, where the number of intermediate time steps is greater than the number of input time steps. The ground-truth audio features 304 can include any appropriate features characterizing the output audio sequence. For example, the ground-truth audio features 304 can include a mel-spectrogram of the output audio sequence, e.g., generated from a ground-truth output audio sequence of a speaker speaking the training input text sequence 302. Instead or in addition, the ground-truth audio features can include a log spectrogram generated from the ground-truth output audio sequence, waveform features of the ground-truth output audio sequence, or pitch contour features of the ground-truth output audio sequence. Instead or in addition, the ground-truth audio features can include vocoder parameters of a vocoder configured to synthesize the output audio sequence.

For each training example, the training system 100 can process the training input text sequence 302 using the encoder neural network 310 to generate a modified input sequence 312 that includes a respective representation for each text element of the training text sequence 302. For example, the encoder neural network 310 can be configured similarly to the encoder neural network 110 described above with reference to FIG. 1.

The training system 300 can process the ground-truth audio features 304 using the audio feature embedding neural network 320 to generate a set of embedded audio features that includes, for each intermediate time step represented by the ground-truth audio features 304, an embedding of the corresponding audio features 304. In implementations in which the ground-truth audio features 304 include a mel-spectrogram, the audio feature embedding neural network 320 is sometimes called a spectrogram embedding neural network. For example, the audio feature embedding neural network 320 can include one or more convolutional neural network layers that are configured to apply convolutional kernels to the sequence of ground-truth audio features 304 (or processed versions thereof) to generate the sequence of embedded audio features 322. As another example, the audio feature embedding neural network 320 can include one or more recurrent neural network layers, e.g., one or more bi-directional LSTM neural network layers, that are configured to recurrently process the sequence of ground-truth audio features 304 to generate the sequence of embedded audio features.

The training system 300 can then process (i) the modified input sequence 312 and (ii) the embedded audio features 322 using the attention-based neural network 330 to generate the set of latent features 332 of the output audio sequence. The set of latent features 332 includes a respective set of features corresponding to each input time step, i.e., corresponding to each representation of the modified input sequence 312. Because the attention-based neural network 330 "combines" the modified input sequence 312 and the embedded audio features 322 to generate the latent features 332, the attention-based neural network 330 is sometimes called a combining neural network.

The attention-based neural network 330 can process the modified input sequence 312 and the embedded audio features 322 using one or more attention neural network layers to align the two input. In particular, for each representation in the modified input sequence 312, the attention-based neural network can generate a respective attention output by applying an attention mechanism over the respective embedded audio features 322 corresponding to each intermediate time step. That is, the attention-based neural network 330 can determine, for each input time step i:

$$c_i = \mathrm{Attn}(h_i, f_{spec}(Y^*))$$

where $c_i$ is the attention output for input time step i; Attn is an attention mechanism, e.g., dot-product attention or scaled dot product attention; $h_i$ is the representation in the modified input sequence 312 corresponding to input time step i and is used as the query for the attention mechanism; $Y^*$ is the set of ground-truth audio features 304; and $f_{spec}$ represents the output of the audio feature embedding neural network 320 and is used as the values for the attention mechanism.

In some implementations, one or more of the attention neural network layers can be a multi-head attention neural network layer that receives a layer input, applies multiple different attention mechanisms to the layer input to generate respective sets of attention outputs, and combines the respective attention outputs to generate the final set of attention outputs. For example, the multi-head attention neural network layer can apply the multiple different attention mechanisms in parallel.

The attention-based neural network 330 can then process (i) the modified input sequence 312 and (ii) the generated attention outputs corresponding to respective representations in the modified input sequence 312 to generate the latent features 332. For example, the attention-based neural network 330 can process the two inputs using a variational auto-encoder. As a particular example, the variational auto-encoder can be a conditional variational auto-encoder conditioned on the modified input sequence 312. The variational auto-encoder can have a Gaussian prior, e.g., N(0,1).

For instance, the attention-based neural network 330 can optimize the variational auto-encoder using an evidence lower-bound (ELBO):

$$\log p(Y \mid H) \geq -\sum_i D_{KL}(q(z_i \mid h_i, c_i) \| p(z_i)) + \mathbb{E}_{q(z_i|h_i,c_i)}[\log p(Y \mid H, Z)]$$

where H is the modified input sequence 312, Z is the posterior latent features 332, the first term is the KL divergence between the prior and the posterior, and the second term can be approximated by drawing samples from the posterior.

The training system 300 can then combine, e.g., through concatenation, (i) the modified input sequence 312 and (ii) the latent features 332 of the ground-truth audio features 304 (and optionally, an identification of a class to which the output audio sequence should belong, as described above) to generate the input to the duration prediction neural network 340, which can be called the training modified input sequence.

The duration prediction neural network 340 can then process the training modified input sequence to generate predicted durations for each representation in the modified input sequence 312, and upsample the modified input sequence 312 according to the predicted durations to generate an intermediate sequence 342 that includes a respective intermediate element for each of the intermediate time steps. For example, the duration prediction neural network 340 can be configured similarly to the duration prediction neural network 120 described above with reference to FIG. 1 or the duration prediction neural network 200 described above with reference to FIG. 2.

Thus, even without ground-truth durations to guide training, the training system 300 can use the ground-truth audio features 304 to provide information to the duration prediction neural network 340 to help train the duration prediction neural network 340.

In some implementations, the training system 300 can execute "teacher forcing" with respect to the total duration of the intermediate elements of the intermediate sequence 342. Although ground-truth durations are not available for each text element in the input text sequence 302, the total duration of the output audio sequence can be known, and the training system 300 can enforce that the duration of the intermediate sequence 342 matches the ground-truth total duration of the output audio sequence. If the sum of the predicted durations of the representations in the modified input sequence 312, as determined by the duration prediction neural network 340, is different than the required total duration of the intermediate sequence 342, the duration neural network 340 can modify the respective predicted durations of the representations before upsampling. For example, the duration prediction neural network 340 can scale the predicted duration of each representation according to the ratio between the required duration of the intermediate sequence 342 and the sum of the predicted durations. Thus, the training system 300 can enforce that the mel-spectrogram 352 generated by neural network is the same size as a corresponding ground-truth mel-spectrogram, which can be helpful when determining an error of the mel-spectrogram 352.

Because at inference a ground-truth set of audio features 304 is not available, in these implementations, at inference time the neural network can generate the input to the duration prediction neural network 340 by combining, e.g., concatenating, (i) the modified input sequence 312 and (ii) a set of features determined from a prior distribution for the latent features 332. The prior distribution can be, e.g., the prior of the variational auto-encoder described above, e.g., a Gaussian prior.

For example, the set of features can be the mode of the prior distribution, or can be randomly sampled from the prior distribution. As a particular example, the mode of the prior distribution can be the zero vector.

The decoder neural network 350 can process the intermediate sequence to generate a mel-spectrogram 352 characterizing the output audio sequence. For example, the decoder neural network 350 can be configured similarly to the decoder neural network 130 described above with reference to FIG. 1. As described above, although depicted in FIG. 3 as generating a mel-spectrogram 352, generally the decoder neural network 350 can be configured to process the intermediate sequence 342 to generate a corresponding sequence of any appropriate set of audio features.

A training engine 360 can determine a parameter update 362 to each of one or more of: the encoder neural network 310, the audio feature embedding neural network 320, the attention-based neural network 330, the duration prediction neural network 340, or the decoder neural network 350. In some implementations, the training engine 360 determines a parameter update 362 for each neural network. In some other implementations, one or more of the neural networks have been pre-trained, and the training system 300 freezes their parameter values during the training of the other neural networks.

The training engine 360 can determine the parameter update using a loss function that includes a first term characterizing an error in the predicted mel-spectrogram (and, optionally, an initial mel spectrogram). As a particular example, the first term can be (or be proportional to) one of the $\mathcal{L}_{spec}$ terms identified above with reference to FIG. 1 As another particular example, the first term can be (or be proportional to) the second term of the ELBO expression identified above, i.e., $$\mathbb{E}_{q(z_i|h_i,c_i)}[\log p(Y|H,Z)]$$

Instead or in addition, the loss function can include a second term characterizing an error in the total predicted duration of the output audio sequence (i.e., the sum of all predicted durations). That is, although ground-truth durations are not available for each text element in the input text sequence 302, the total duration of the output audio sequence can be known and compared to the total duration, e.g., of the mel-spectrogram 352. As a particular example, the second term can be (or be proportional to):

$$\mathcal{L}_u = \frac{1}{N}\left\| T - \sum_i d_i \right\|_2^2,$$

where N is the number of representations in the modified input sequence 312, T is the number of intermediate time steps, $d_i$ represents the predicted duration of representation i in the modified input sequence, and $\|\cdot\|_2$ is an $L_2$ loss.

Instead or in addition, the loss function can include a third term characterizing a KL divergence loss of the variational auto-encoder in the attention-based neural network 330. As a particular example, the third term can be (or be proportional to) the first term of the ELBO expression identified above, i.e., $$-\sum_i D_{KL}(q(z_i \mid h_i, c_i) \| p(z_i))$$

In some implementations, the training data store 301 includes, in addition to training examples without ground-truth durations, one or more labeled training examples that include ground-truth durations. In these implementations, when processing a labeled training example, the training system 300 can determine a loss function that includes at least a fourth term characterizing an error in the predicted durations generated by the duration prediction neural network 340, e.g., the $\mathcal{L}_{spec}$ term identified above with reference to FIG. 1.

After the training system 300 has trained the neural network, the neural network can be deployed in any appropriate setting, e.g., in a data center or on an edge device as described above with reference to FIG. 1.

Figure 4:
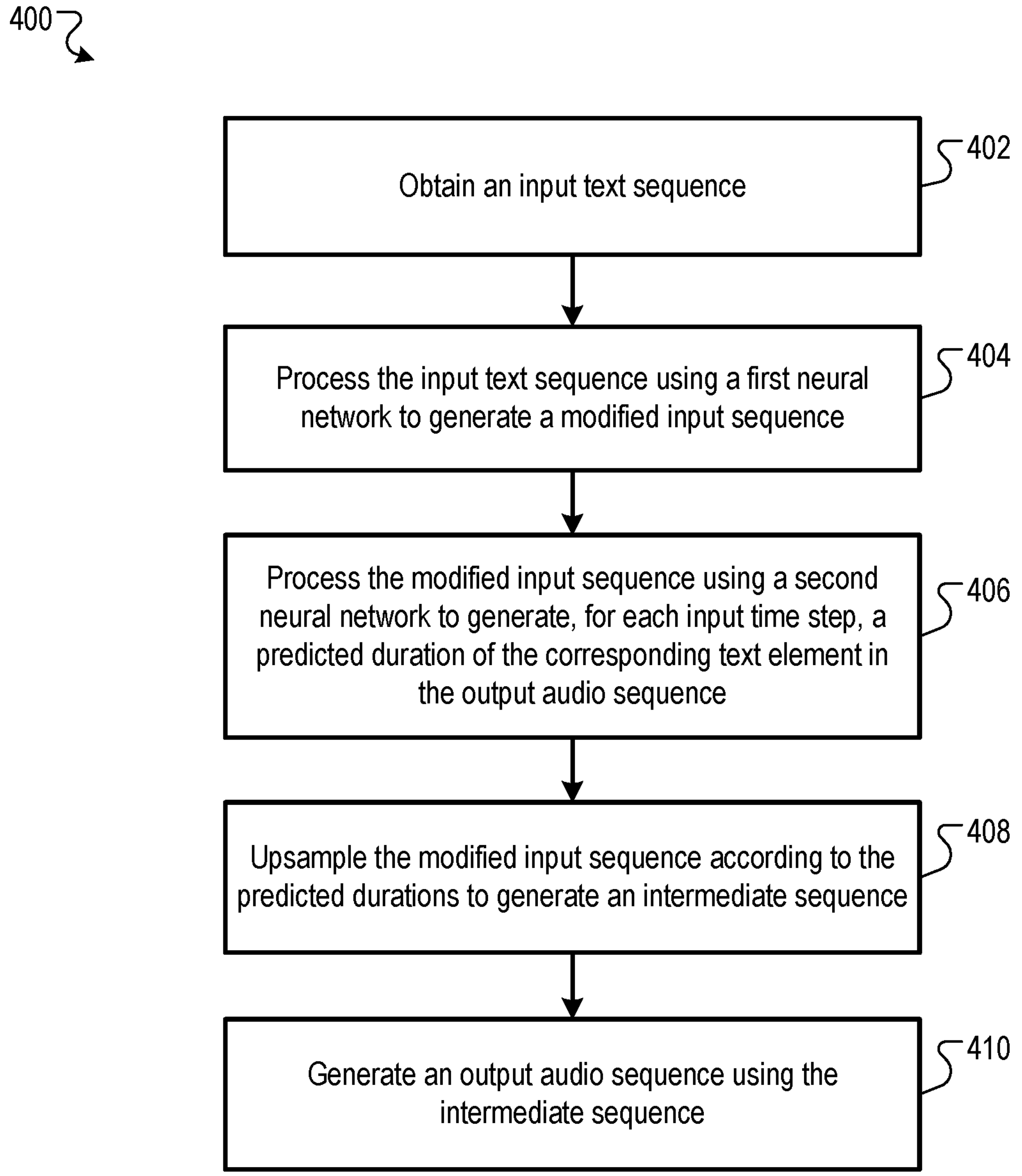
FIG. 4 is a flow diagram of an example process for processing an input text sequence using a neural network system to generate an output audio sequence.

FIG. 4 is a flow diagram of an example process 400 for processing an input text sequence using a neural network system to generate an output audio sequence. For convenience, the process 400 will be described as being performed by a system of one or more computers located in one or more locations. For example, a neural network system, e.g., the neural network system 100 depicted in FIG. 1, appropriately programmed in accordance with this specification, can perform the process 400.

The system obtains the input text sequence (step 402). The input text sequence can include a respective text element at each of multiple input time steps. For example, each text element represents a character, a phoneme, or a word. Instead or in addition, each text element can include a set of linguistic features derived from the text data represented by the input text sequence.

The system processes the input text sequence using a first neural network to generate a modified input sequence (step 404). The modified input sequence can include, for each of the multiple input time steps, a representation of the corresponding text element in the input text sequence. For example, the first neural network can be the encoder neural network 110 described above with reference to FIG. 1. As another example, the first neural network can include the encoder neural network 310, the audio feature embedding neural network 320, and the attention-based neural network 330 described above with reference to FIG. 3.

For example, the system can obtain, for each text element in the input text sequence, a predetermined embedding of the text element. The system can then process the predetermined embeddings of the text elements using the first neural network to generate the modified input sequence.

In some implementations, the first neural network includes one or more of: one or more convolutional neural network layers, one or more uni-directional LSTM neural network layers, or one or more bi-directional LSTM neural network layers.

In some implementations, the system can process the input text sequence using the first neural network to generate an initial modified input sequence that includes a respective initial representation at each input time step. The system can then combine, for each initial representation, the initial representation with an identification of a class to which the output audio sequence should belong, e.g., by concatenating the initial representations with the identification of the class. For example, each class can correspond to a speaker that the output audio sequence should sound like.

The system processes the modified input sequence using a second neural network to generate, for each input time step, a predicted duration of the corresponding text element in the output audio sequence (step 406).

For example, the second neural network can be the duration neural network 120 described above with reference to FIG. 1; the duration neural network 200 described above with reference to FIG. 2; or the duration prediction neural network 340 described above with reference to FIG. 3.

For example, the second neural network can include on or more of: one or more convolutional neural network layers; one or more uni-directional LSTM neural network layers; one or more bi-directional LSTM neural network layers; or an output projection layer that is configured to receive a respective layer input for each representation in the modified input sequence and to generate the predicted duration for each representation in the modified input sequence.

The system upsamples the modified input sequence according to the predicted durations to generate an intermediate sequence (step 408). The intermediate sequence can include a respective intermediate element at each of multiple intermediate time steps.

In some implementations, the system can determine, for each representation in the modified input sequence, a distribution over the intermediate sequence according to the predicted duration of the representation. The system can then generate each intermediate element in the intermediate sequence by determining a weighted sum of the representations, where each representation is weighted according to the value of the intermediate element in the distribution over the intermediate sequence corresponding to the representation. For example, the distribution for each respective representation can be a Gaussian distribution, wherein a center of the Gaussian distribution corresponds to a center of the predicted duration of the representation.

In some such implementations, a variance of the Gaussian distribution for each respective representation can be generated by processing the modified input sequence using a fourth neural network, e.g., the range prediction subnetwork 220 of the duration prediction neural network 200 described above with reference to FIG. 2. For example, the system can combine each representation in the modified input sequence with the predicted duration of the representation to generate a respective combined representation. The system can process the combined representations using the fourth neural network to generate the respective variance of the Gaussian distribution for each representation. As a particular example, the fourth neural network can include one or more of: one or more convolutional neural network layers; one or more uni-directional LSTM neural network layers; one or more bi-directional LSTM neural network layers; or an output projection layer that is configured to receive a respective layer input for each representation in the modified input sequence and to generate the respective variance of the Gaussian distribution for each representation in the modified input sequence.

In some implementations, the system can upsample the modified input sequence to generate an upsampled sequence comprising a respective upsampled representation at each intermediate time step. The system can generate the intermediate sequence from the upsampled sequence by combining, for each upsampled representation in the upsampled text sequence, the upsampled representation with a positional embedding of the upsampled representation. For example, the positional embedding of an upsampled representation can identify a position of the upsampled representation in a subsequence of upsampled representations corresponding to the same representation in the modified input sequence.

The system generates the output audio sequence using the intermediate sequence (step 410). The output audio sequence can include a respective audio sample at each of multiple output time steps. In some implementations, the output time steps are the same as the intermediate time steps.

For example, the system can process the intermediate sequence using a third neural network to generate a mel-spectrogram that includes a respective spectrogram frame at each intermediate time step. The system can then process the mel-spectrogram to generate the output audio sequence. For instance, the third neural network can be the decoder neural network 130 described above with reference to FIG. 1, or the decoder neural network 350 described above with reference to FIG. 3.

At a first processing time step, the system can process a first intermediate element in the intermediate sequence using the third neural network to generate a first frame of the mel-spectrogram. At each of multiple subsequent processing time steps, the system can process i) a respective subsequent intermediate element in the intermediate sequence and ii) the preceding frame of the mel-spectrogram generated in the preceding processing time step using the third neural network to generate a subsequent frame of the mel-spectrogram. As a particular example, the third neural network can include one or more of: one or more convolutional neural network layers; one or more uni-directional LSTM neural network layers; one or more bi-directional LSTM neural network layers; or an output projection layer that is configured to receive a layer input and to generate the subsequent frame of the mel-spectrogram.

For instance, the system can process the preceding spectrogram frame using one or more fully-connected neural network layers to generate an embedding of the preceding frame, e.g., one or more fully-connected neural network layers of a "pre-net" of the decoder neural network 130 described above with reference to FIG. 3. The system can then process i) the subsequent intermediate element in the intermediate sequence and ii) the embedding of the preceding frame using the third neural network to generate the subsequent frame of the mel-spectrogram.

As a particular example, the system can concatenate i) the subsequent intermediate element in the intermediate sequence and ii) the embedding of the preceding frame to generate a first concatenated representation; and process the first concatenated representation using a first subnetwork of the third neural network to generate an embedding of the first concatenated representation. For example, the first subnetwork can include one or more uni-directional LSTM neural network layers. The system can then concatenate i) the subsequent intermediate element in the intermediate sequence and ii) the embedding of the first concatenated representation to generate a second concatenated representation; and process the second concatenated representation using a second subnetwork of the third neural network to generate the subsequent frame of the mel-spectrogram. For example, the second subnetwork can include an output projection neural network layer, e.g., a feedforward neural network layer, that is configured to generate the subsequent frame of the mel-spectrogram.

In some implementation, to generate the mel-spectrogram, the system can process the intermediate sequence using a third subnetwork of the third neural network to generate an initial mel-spectrogram. For example, the third subnetwork can include the first subnetwork and the second subnetwork. The system can then process the initial mel-spectrogram using a fourth subnetwork of the third neural network to generate the mel-spectrogram. For example, the fourth subnetwork can include one or more convolutional neural network layers, e.g., one or more convolutional neural network layers of a "post-net" of the decoder neural network 130 described above with reference to FIG. 3.

In some implementations, the first neural network, the second neural network, and the third neural network have been trained concurrently. In some such implementations, the neural networks can be trained without any ground-truth durations for representations in the modified input sequence.

For example, a training system can obtain a training input text sequence that includes a respective training text element at each of multiple training input time steps. The training system can process the training input text sequence using a first subnetwork of the first neural network (e.g., the encoder neural network 310 described above with reference to FIG. 3) to generate an embedding of the training input text sequence. The training system can obtain a ground-truth mel-spectrogram corresponding to the training input text sequence. The training system can process the ground-truth mel-spectrogram using a second subnetwork of the first neural network (e.g., the audio feature embedding neural network 320 described above with reference to FIG. 3) to generate an embedding of the ground-truth mel-spectrogram. The training system can combine i) the embedding of the training input text sequence and ii) the embedding of the ground-truth mel-spectrogram to generate a training modified input sequence that includes, for each training input time step, a representation of the corresponding training text element in the training input text sequence. The training system can then process the training modified input sequence using the second neural network (e.g., the duration prediction neural network 340) to generate, for each representation in the training modified input sequence, a predicted duration of the representation.

As a particular example, the training system can combine i) the embedding of the training input text sequence and ii) the embedding of the ground-truth mel-spectrogram by processing the two embeddings using a third subnetwork of the first neural network, e.g., the attention-based neural network 330 described above with reference to FIG. 3.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method for generating an output audio sequence from an input text sequence, wherein the input text sequence comprises a respective text element at each of a plurality of input time steps and the output audio sequence comprises a respective audio sample at each of a plurality of output time steps, the method comprising:

processing the input text sequence using a first neural network to generate a modified input sequence comprising, for each of the plurality of input time steps, a representation of the corresponding text element in the input text sequence;

processing the modified input sequence using a second neural network to generate, for each input time step, a predicted duration of the corresponding text element in the output audio sequence;

upsampling the modified input sequence according to the predicted durations to generate an intermediate sequence comprising a respective intermediate element at each of a plurality of intermediate time steps; and generating the output audio sequence using the intermediate sequence.

Embodiment 2 is the method of embodiment 1, wherein processing the input text sequence using the first neural network to generate the modified input sequence comprises:

obtaining, for each text element in the input text sequence, a predetermined embedding of the text element; and processing the predetermined embeddings of the plurality of text elements using the first neural network to generate the modified input sequence.

Embodiment 3 is the method of any one of embodiments 1 or 2, wherein the first neural network comprises one or more of:

one or more convolutional neural network layers;

one or more uni-directional LSTM neural network layers; or one or more bi-directional LSTM neural network layers.

Embodiment 4 is the method of any one of embodiments 1-3, wherein processing the input text sequence using a first neural network to generate the modified input sequence comprises:

processing the input text sequence using the first neural network to generate an initial modified input sequence comprising a respective initial representation at each of the plurality of input time steps; and generating the modified input sequence from the initial modified input sequence, comprising combining, for each initial representation in the initial modified input sequence, the initial representation with an identification of a class to which the output audio sequence should belong.

Embodiment 5 is the method of embodiment 4, wherein each class corresponds to a speaker that the output audio sequence should sound like.

Embodiment 6 is the method of any one of embodiments 1-5, wherein the second neural network comprises one or more of:

one or more convolutional neural network layers;

one or more uni-directional LSTM neural network layers;

one or more bi-directional LSTM neural network layers; or an output projection layer that is configured to receive a respective layer input for each representation in the modified input sequence and to generate the predicted duration for each representation in the modified input sequence.

Embodiment 7 is the method of any one of embodiments 1-6, wherein upsampling the modified input sequence according to the predicted durations to generate an intermediate sequence comprises:

determining, for each representation in the modified input sequence, a distribution over the intermediate sequence according to the predicted duration of the representation; and for each intermediate element in the intermediate sequence, generating the intermediate element by determining a weighted sum of the representations, wherein each representation is weighted according to a value of the intermediate element in the distribution over the intermediate sequence corresponding to the representation.

Embodiment 8 is the method of embodiment 7, wherein the distribution for each respective representation is a Gaussian distribution, wherein a center of the Gaussian distribution corresponds to a center of the predicted duration of the representation.

Embodiment 9 is the method of embodiment 8, wherein the center of the Gaussian distribution for a particular representation is:

$$c_i = \frac{d_i}{2} + \sum_{j=1}^{i-1} d_j,$$

wherein $c_i$ is the center of the Gaussian distribution for the particular representation, $d_i$ is the predicted duration of the particular representation, and each $d_j$ is the predicted duration of a respective representation that precedes the particular representation in the modified input sequence.

Embodiment 10 is the method of any one of embodiments 8 or 9, wherein a variance of the Gaussian distribution for each respective representation is generated by processing the modified input sequence using a fourth neural network.

Embodiment 11 is the method of embodiment 10, wherein processing the modified input sequence using the fourth neural network comprises:

combining, for each representation in the modified input sequence, the representation with the predicted duration of the representation to generate a respective combined representation; and processing the combined representations using the fourth neural network to generate the respective variance of the Gaussian distribution for each representation.

Embodiment 12 is the method of any one of embodiments 10 or 11, wherein the fourth neural network comprises one or more of:

one or more convolutional neural network layers;

one or more uni-directional LSTM neural network layers;
one or more bi-directional LSTM neural network layers; or
an output projection layer that is configured to receive a respective layer input for each representation in the modified input sequence and to generate the respective variance of the Gaussian distribution for each representation in the modified input sequence.

Embodiment 13 is the method of any one of embodiments 1-12, wherein upsampling the modified input sequence to generate an intermediate sequence comprises:

upsampling the modified input sequence to generate an upsampled sequence comprising a respective upsampled representation at each of the plurality of intermediate time steps; and generating the intermediate sequence from the upsampled sequence, comprising combining, for each upsampled representation in the upsampled text sequence, the upsampled representation with a positional embedding of the upsampled representation.

Embodiment 14 is the method of embodiment 13, wherein the positional embedding of an upsampled representation identifies a position of the upsampled representation in a subsequence of upsampled representations corresponding to the same representation in the modified input sequence.

Embodiment 15 is the method of any one of embodiments 1-14, wherein the first neural network and the second neural network have been trained concurrently.

Embodiment 16 is the method of any one of embodiments 1-15, wherein generating the output audio sequence using the intermediate sequence comprises:

processing the intermediate sequence using a third neural network to generate a mel-spectrogram comprising a respective spectrogram frame at each of the plurality of intermediate time steps; and processing the mel-spectrogram to generate the output audio sequence.

Embodiment 17 is the method of embodiment 16, wherein processing the intermediate sequence using a third neural network to generate a mel-spectrogram comprises:

at a first processing time step in a sequence of processing time steps, processing a first intermediate element in the intermediate sequence using the third neural network to generate a first frame of the mel-spectrogram; and at each subsequent processing time step in the sequence of processing time steps, processing i) a subsequent intermediate element in the intermediate sequence and ii) a preceding frame of the mel-spectrogram generated in a preceding processing time step using the third neural network to generate a subsequent frame of the mel-spectrogram.

Embodiment 18 is the method of embodiment 17, wherein the third neural network comprises one or more of:

one or more convolutional neural network layers;
one or more uni-directional LSTM neural network layers;
one or more bi-directional LSTM neural network layers; or
an output projection layer that is configured to receive a layer input and to generate the subsequent frame of the mel-spectrogram.

Embodiment 19 is the method of any one of embodiments 17 or 18, wherein processing i) the subsequent intermediate element in the intermediate sequence and ii) the preceding frame of the mel-spectrogram using the third neural network comprises:

processing the preceding frame using one or more fully-connected neural network layers to generate an embedding of the preceding frame; and processing i) the subsequent intermediate element in the intermediate sequence and ii) the embedding of the preceding frame using the third neural network to generate the subsequent frame of the mel-spectrogram.

Embodiment 20 is the method of embodiment 19, wherein processing i) the subsequent intermediate element in the intermediate sequence and ii) the embedding of the preceding frame using the third neural network comprising:

concatenating i) the subsequent intermediate element in the intermediate sequence and ii) the embedding of the preceding frame to generate a first concatenated representation;

processing the first concatenated representation using a first subnetwork of the third neural network to generate an embedding of the first concatenated representation;

concatenating i) the subsequent intermediate element in the intermediate sequence and ii) the embedding of the first concatenated representation to generate a second concatenated representation; and processing the second concatenated representation using a second subnetwork of the third neural network to generate the subsequent frame of the mel-spectrogram.

Embodiment 21, is the method of any one of embodiments 16-20, wherein processing the intermediate sequence using the third neural network to generate the mel-spectrogram comprises:

processing the intermediate sequence using a third subnetwork of the third neural network to generate an initial mel-spectrogram; and processing the initial mel-spectrogram using a fourth subnetwork of the third neural network to generate the mel-spectrogram.

Embodiment 22 is the method of embodiment 21, wherein the fourth subnetwork of the third neural network comprises one or more convolutional neural network layers.

Embodiment 23 is the method of any one of embodiments 16-22, wherein the first neural network, the second neural network, and the third neural network have been trained concurrently.

Embodiment 24 is the method of embodiment 23, wherein the neural networks are trained using a loss term that includes one or more of:

a first term characterizing an error in the predicted durations of the representations in the modified input sequence; or
a second term characterizing an error in the generated mel-spectrogram.

Embodiment 25 is the method of embodiment 24, wherein the first term is:

$$\mathcal{L}_{dur} = \frac{1}{N}\|d - d^*\|_2^2,$$

wherein N is a number of representations in the modified input sequence, d represents the predicted durations, d* represents ground-truth durations, and $\|\cdot\|_2$ is an $L_2$ loss.

Embodiment 26 is the method of any one of embodiments 24 or 25, wherein the second term is:

$$\mathcal{L}_{spec} = \frac{1}{TK}\sum_{t=1}^{T}\left(\|y_t - y_t^*\|_1 + \|y_t - y_t^*\|_2^2\right),$$

wherein T is a number of intermediate time steps, K is a number of frequencies represented in the mel spectrogram, $y_t$ is the generated mel-spectrogram, $y_t$* is a ground-truth mel-spectrogram, $\|\cdot\|_1$ is an $L_1$ loss, and $\|\cdot\|_2$ is an $L_2$ loss.

Embodiment 27 is the method of any one of embodiments 24 or 25, wherein the second term characterizes an error in both i) the generated mel-spectrogram and ii) an initial mel-spectrogram generated by the third neural network, wherein the mel-spectrogram is generated by processing the initial mel-spectrogram using a fourth subnetwork of the third neural network.

Embodiment 28 is the method of embodiment 27, wherein the second term is:

$$\mathcal{L}_{spec} = \frac{1}{TK}\sum_{t=1}^{T}\left(\|y_t' - y_t^*\|_1 + \|y_t' - y_t^*\|_2^2 + \|y_t - y_t^*\|_1 + \|y_t - y_t^*\|_2^2\right),$$

wherein T is a number of intermediate time steps, K is a number of frequencies represented in the mel spectrogram, $y_t$' is the initial mel-spectrogram, $y_t$ is the generated mel-spectrogram, $y_t$* is a ground-truth mel-spectrogram, $\|\cdot\|_1$ is an $L_1$ loss, and $\|\cdot\|_2$ is an $L_2$ loss.

Embodiment 29 is the method of any one of embodiments 23-28, wherein the training comprised teacher forcing using ground-truth durations for each representation in the modified input sequence.

Embodiment 30 is the method of embodiment 23, wherein the training comprised training the neural networks without any ground-truth durations for representations in the modified input sequence.

Embodiment 31 is the method of embodiment 30, wherein the training comprised:

obtaining a training input text sequence comprising a respective training text element at each of a plurality of training input time steps;

processing the training input text sequence using a first subnetwork of the first neural network to generate an embedding of the training input text sequence;

obtaining a ground-truth mel-spectrogram corresponding to the training input text sequence;

processing the ground-truth mel-spectrogram using a second subnetwork of the first neural network to generate an embedding of the ground-truth mel-spectrogram;

combining i) the embedding of the training input text sequence and ii) the embedding of the ground-truth mel-spectrogram to generate a training modified input sequence comprising, for each of the plurality of training input time steps, a representation of the corresponding training text element in the training input text sequence; and processing the training modified input sequence using the second neural network to generate, for each representation in the training modified input sequence, a predicted duration of the representation.

Embodiment 32 is the method of embodiment 31, wherein combining i) the embedding of the training input text sequence and ii) the embedding of the ground-truth mel-spectrogram comprises processing i) the embedding of the training input text sequence and ii) the embedding of the ground-truth mel-spectrogram using a third subnetwork of the first neural network.

Embodiment 33 is the method of embodiment 32, wherein processing i) the embedding of the training input text sequence and ii) the embedding of the ground-truth mel-spectrogram using the third subnetwork of the first neural network comprises:

aligning i) the embedding of the training input text sequence and ii) the embedding of the ground-truth mel-spectrogram using one or more attention neural network layers;

processing the aligned embedding of the ground-truth mel-spectrogram using a variational auto-encoder to generate aligned latent features of the ground-truth mel-spectrogram; and concatenating i) the embedding of the training input text sequence and ii) the aligned latent features of the ground-truth mel-spectrogram.

Embodiment 34 is the method of embodiment 33, wherein the variational auto-encoder is a conditional variational auto-encoder conditioned on the embedding of the training input text sequence.

Embodiment 35 is the method of any one of embodiments 31-34, wherein at inference generating the modified input sequence comprises:

processing the input text sequence using the first subnetwork of the first neural network to generate an embedding of the input text sequence; and combining i) the embedding of the input text sequence and ii) a mode of a prior distribution of mel-spectrograms to generate the modified input sequence.

Embodiment 36 is the method of embodiment 35, wherein the mode of the prior distribution of mel-spectrograms is a zero vector.

Embodiment 37 is the method of any one of embodiments 31-36, wherein the neural networks are trained using a loss term that includes one or more of:

a first term characterizing an error in the generated mel-spectrogram;

a second term characterizing an error in a total predicted duration of the output audio sequence; or a third term characterizing a KL divergence loss of a variational auto-encoder of a third subnetwork of the first neural network.

Embodiment 38 is the method of embodiment 37, wherein the first term is:

$$\mathcal{L}_{spec} = \frac{1}{TK}\sum_{t=1}^{T}\left(\|y_t - y_t^*\|_1 + \|y_t - y_t^*\|_2^2\right)$$

wherein Tis a number of intermediate time steps, K is a number of frequencies represented in the mel spectrogram, $y_t$ is the generated mel-spectrogram, $y_t$* is a ground-truth mel-spectrogram, $\|\cdot\|_1$ is an $L_1$ loss, and $\|\cdot\|_2$ is an $L_2$ loss.

Embodiment 39 is the method of embodiment 37, wherein the first term characterizes an error in both i) the generated mel-spectrogram and ii) an initial mel-spectrogram generated by the third neural network, wherein the mel-spectrogram is generated by processing the initial mel-spectrogram using a fourth subnetwork of the third neural network.

Embodiment 40 is the method of embodiment 39, wherein the first term is:

$$\mathcal{L}_{spec} = \frac{1}{TK}\sum_{t=1}^{T}\left(\|y_t' - y_t^*\|_1 + \|y_t' - y_t^*\|_2^2 + \|y_t - y_t^*\|_1 + \|y_t - y_t^*\|_2^2\right),$$

wherein T is a number of intermediate time steps, K is a number of frequencies represented in the mel spectrogram, $y_t'$ is the initial mel-spectrogram, $y_t$ is the generated mel-spectrogram, $y_t^*$ is a ground-truth mel-spectrogram, $\|\cdot\|_1$ is an $L_1$ loss, and $\|\cdot\|_2$ is an $L_2$ loss.

Embodiment 41 is the method of any one of embodiments 37-40, wherein the second term is:

$$\mathcal{L}_u = \frac{1}{N}\left\|T - \sum_i d_i\right\|_2^2,$$

wherein N is a number of representations in the modified input sequence, T is a number of intermediate time steps, $d_i$ represents the predicted duration of representation i in the modified input sequence, and $\|\cdot\|_2$ is an $L_2$ loss.

Embodiment 42 is the method of any one of embodiments 1-41, wherein the plurality of intermediate time steps are the same as the plurality of output time steps.

Embodiment 43 is the method of any one of embodiments 1-42, wherein:

each text element represents a character;

each text element represents a phoneme;

each text element represents a word; or each text element comprises a plurality of linguistic features derived from an input text.

Embodiment 44 is a system comprising: one or more computers and one or more storage devices storing instructions that are operable, when executed by the one or more computers, to cause the one or more computers to perform the method of any one of embodiments 1 to 43.

Embodiment 45 is one or more non-transitory computer storage medium encoded with a computer program, the program comprising instructions that are operable, when executed by data processing apparatus, to cause the data processing apparatus to perform the method of any one of embodiments 1 to 43.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for generating an output audio sequence from an input text sequence, wherein the input text sequence comprises a respective text element at each of a plurality of input time steps and the output audio sequence comprises a respective audio sample at each of a plurality of output time steps, the method comprising:

processing the input text sequence using a first neural network to generate a modified input sequence comprising, for each of the plurality of input time steps, a representation of the corresponding text element in the input text sequence;

processing the modified input sequence using a second neural network to generate, for each input time step, a predicted duration of the corresponding text element in the output audio sequence;

upsampling the modified input sequence according to the predicted durations to generate an intermediate sequence comprising a respective intermediate element at each of a plurality of intermediate time steps, the upsampling comprising:

determining, for each representation in the modified sequence and using the predicted durations of the corresponding text elements in the output audio sequence, parameters of a distribution for the representation that assigns a respective value to each intermediate element that models an influence of the representation on the intermediate element based on the predicted durations for the corresponding text elements wherein the distribution for the representation is a Gaussian distribution, and wherein a center of the Gaussian distribution corresponds to a center of the predicted duration of the representation; and generating each intermediate element of the intermediate sequence based on the distributions for the representations in the modified sequence, the generating comprising, for each particular intermediate element:

determining a respective weight for each representation from the value assigned to the particular intermediate element in the distribution generated for the representation; and generating the particular intermediate element by determining a weighted sum of the representations, wherein each representation is weighted according to the respective weight for the representation; and generating the output audio sequence using the intermediate sequence.

2. The method of claim 1, wherein the center of the Gaussian distribution for a particular representation is:

$$c_i = \frac{d_i}{2} + \sum_{j=1}^{i-1} d_j,$$

wherein $c_i$ is the center of the Gaussian distribution for the particular representation, $d_i$ is the predicted duration of the particular representation, and each $d_j$ is the predicted duration of a respective representation that precedes the particular representation in the modified input sequence.

3. The method of claim 1, wherein a variance of the Gaussian distribution for each respective representation is generated by processing the modified input sequence using a fourth neural network.

4. The method of claim 3, wherein processing the modified input sequence using the fourth neural network comprises:

combining, for each representation in the modified input sequence, the representation with the predicted duration of the representation to generate a respective combined representation; and processing the combined representations using the fourth neural network to generate the respective variance of the Gaussian distribution for each representation.

5. The method of claim 1, wherein upsampling the modified input sequence to generate an intermediate sequence comprises:

upsampling the modified input sequence to generate an upsampled sequence comprising a respective upsampled representation at each of the plurality of intermediate time steps; and generating the intermediate sequence from the upsampled sequence, comprising combining, for each upsampled representation in the upsampled text sequence, the upsampled representation with a positional embedding of the upsampled representation.

6. The method of claim 5, wherein the positional embedding of an upsampled representation identifies a position of the upsampled representation in a subsequence of upsampled representations corresponding to the same representation in the modified input sequence.

7. The method of claim 1, wherein generating the output audio sequence using the intermediate sequence comprises:

processing the intermediate sequence using a third neural network to generate a mel-spectrogram comprising a respective spectrogram frame at each of the plurality of intermediate time steps; and processing the mel-spectrogram to generate the output audio sequence.

8. The method of claim 7, wherein the first neural network, the second neural network, and the third neural network have been trained concurrently.

9. The method of claim 8, wherein the neural networks are trained using a loss term that includes one or more of:

a first term characterizing an error in the predicted durations of the representations in the modified input sequence; or a second term characterizing an error in the generated mel-spectrogram.

10. The method of claim 8, wherein the training comprises teacher forcing using ground-truth durations for each representation in the modified input sequence.

11. The method of claim 8, wherein the training comprises training the neural networks without any ground-truth durations for representations in the modified input sequence.

12. The method of claim 11, wherein the training comprises:

obtaining a training input text sequence comprising a respective training text element at each of a plurality of training input time steps;

processing the training input text sequence using a first subnetwork of the first neural network to generate an embedding of the training input text sequence;

obtaining a ground-truth mel-spectrogram corresponding to the training input text sequence;

processing the ground-truth mel-spectrogram using a second subnetwork of the first neural network to generate an embedding of the ground-truth mel-spectrogram;

combining i) the embedding of the training input text sequence and ii) the embedding of the ground-truth mel-spectrogram to generate a training modified input sequence comprising, for each of the plurality of training input time steps, a representation of the corresponding training text element in the training input text sequence; and processing the training modified input sequence using the second neural network to generate, for each representation in the training modified input sequence, a predicted duration of the representation.

13. The method of claim 12, wherein combining i) the embedding of the training input text sequence and ii) the embedding of the ground-truth mel-spectrogram comprises processing i) the embedding of the training input text sequence and ii) the embedding of the ground-truth mel-spectrogram using a third subnetwork of the first neural network.

14. The method of claim 13, wherein processing i) the embedding of the training input text sequence and ii) the embedding of the ground-truth mel-spectrogram using the third subnetwork of the first neural network comprises:

aligning i) the embedding of the training input text sequence and ii) the embedding of the ground-truth mel-spectrogram using one or more attention neural network layers;

processing the aligned embedding of the ground-truth mel-spectrogram using a variational auto-encoder to generate aligned latent features of the ground-truth mel-spectrogram; and concatenating i) the embedding of the training input text sequence and ii) the aligned latent features of the ground-truth mel-spectrogram.

15. The method of claim 14, wherein the variational auto-encoder is a conditional variational auto-encoder conditioned on the embedding of the training input text sequence.

16. The method of claim 12, wherein at inference generating the modified input sequence comprises:

processing the input text sequence using the first subnetwork of the first neural network to generate an embedding of the input text sequence; and combining i) the embedding of the input text sequence and ii) a mode of a prior distribution of mel-spectrograms to generate the modified input sequence.

17. The method of claim 12, wherein the neural networks are trained using a loss term that includes one or more of:

a first term characterizing an error in the generated mel-spectrogram;

a second term characterizing an error in a total predicted duration of the output audio sequence; or a third term characterizing a KL divergence loss of a variational auto-encoder of a third subnetwork of the first neural network.

18. A system comprising one or more computers and one or more storage devices storing instructions that when executed by the one or more computers cause the one more computers to perform operations for generating an output audio sequence from an input text sequence, wherein the input text sequence comprises a respective text element at each of a plurality of input time steps and the output audio sequence comprises a respective audio sample at each of a plurality of output time steps, the operations comprising:

processing the input text sequence using a first neural network to generate a modified input sequence comprising, for each of the plurality of input time steps, a representation of the corresponding text element in the input text sequence;

processing the modified input sequence using a second neural network to generate, for each input time step, a predicted duration of the corresponding text element in the output audio sequence;

upsampling the modified input sequence according to the predicted durations to generate an intermediate sequence comprising a respective intermediate element at each of a plurality of intermediate time steps, the upsampling comprising:

determining, for each representation in the modified sequence and using the predicted durations of the corresponding text elements in the output audio sequence, parameters of a distribution for the representation that assigns a respective value to each intermediate element that models an influence of the representation on the intermediate element based on the predicted durations for the corresponding text elements, wherein the distribution for the representation is a Gaussian distribution, and wherein a center of the Gaussian distribution corresponds to a center of the predicted duration of the representation; and generating each intermediate element of the intermediate sequence based on the distributions for the representations in the modified sequence, the generating comprising, for each particular intermediate element:

determining a respective weight for each representation from the value assigned to the particular intermediate element in the distribution generated for the representation; and generating the particular intermediate element by determining a weighted sum of the representations, wherein each representation is weighted according to the respective weight for the representation; and generating the output audio sequence using the intermediate sequence.

19. One or more non-transitory computer storage media storing instructions that when executed by one or more computers cause the one more computers to perform operations for generating an output audio sequence from an input text sequence, wherein the input text sequence comprises a respective text element at each of a plurality of input time steps and the output audio sequence comprises a respective audio sample at each of a plurality of output time steps, the operations comprising:

processing the input text sequence using a first neural network to generate a modified input sequence comprising, for each of the plurality of input time steps, a representation of the corresponding text element in the input text sequence;

processing the modified input sequence using a second neural network to generate, for each input time step, a predicted duration of the corresponding text element in the output audio sequence;

upsampling the modified input sequence according to the predicted durations to generate an intermediate sequence comprising a respective intermediate element at each of a plurality of intermediate time steps, the upsampling comprising:

determining, for each representation in the modified sequence and using the predicted durations of the corresponding text elements in the output audio sequence, parameters of a distribution for the representation that assigns a respective value to each intermediate element that models an influence of the representation on the intermediate element based on the predicted durations for the corresponding text elements, wherein the distribution for the representation is a Gaussian distribution, and wherein a center of the Gaussian distribution corresponds to a center of the predicted duration of the representation; and generating each intermediate element of the intermediate sequence based on the distributions for the representations in the modified sequence, the generating comprising, for each particular intermediate element:

determining a respective weight for each representation from the value assigned to the particular intermediate element in the distribution generated for the representation; and generating the particular intermediate element by determining a weighted sum of the representations, wherein each representation is weighted according to the respective weight for the representation; and generating the output audio sequence using the intermediate sequence.

20. The system of claim 18, wherein a variance of the Gaussian distribution for each respective representation is generated by processing the modified input sequence using a fourth neural network.

* * * * *